H. KOPPERS.
METHOD OF CONVEYING WARM LIQUIDS.
APPLICATION FILED AUG. 23, 1912.
1,060,102.
Patented Apr. 29, 1913.
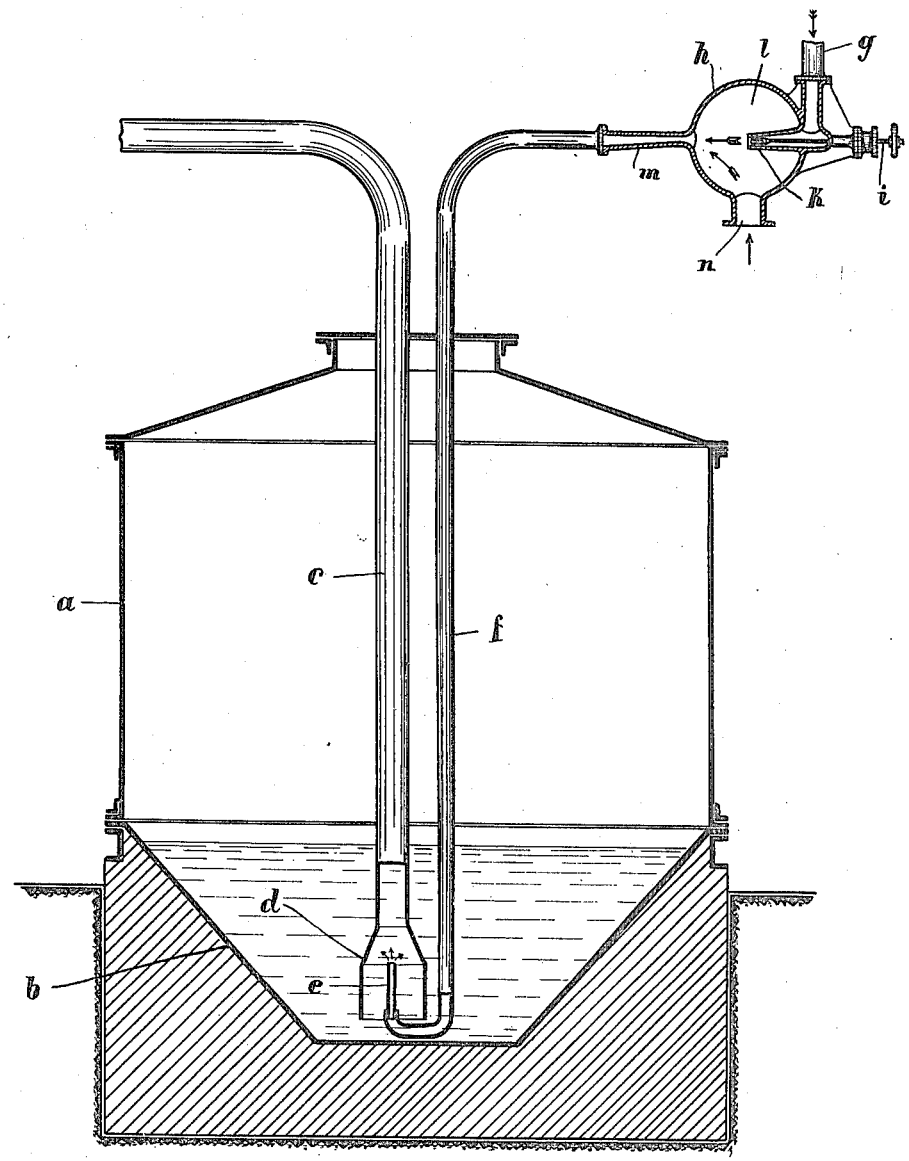

UNITED STATES PATENT OFFICE.

HEINRICH KOPPERS, OF ESSEN-ON-THE-RUHR, GERMANY.

METHOD OF CONVEYING WARM LIQUIDS.

1,060,102.                Specification of Letters Patent.     Patented Apr. 29, 1913.

Application filed August 23, 1912. Serial No. 716,598.

*To all whom it may concern:*

Be it known that I, HEINRICH KOPPERS, residing at Moltkestrasse 29, Essen-on-the-Ruhr, in Prussia, Germany, have invented a certain new and useful Method of Conveying Warm Liquids, of which the following is a specification.

This invention relates to a method of conveying warm liquids, and is more especially intended for removing the saline lye from saturation vessels for the manufacture of sulfate of ammonia, by means of a suction jet consisting of a mixture of steam and air. Heretofore apparatus of this description have been worked either with steam alone or solely with compressed air. In the former case there is the disadvantage that the steam condenses in the liquid to be raised and consequently dilutes it; this is especially undesirable in the direct production of sulfate of ammonia. The use of compressed air obviates this disadvantage, but makes it necessary to provide special apparatus for producing the compressed air.

By using a mixture of hot steam and cooler air the temperature is lowered without withdrawal of heat, that is to say, the temperature at which the mixture condenses is lowered. In other words, the air added to the steam forms a relief gas for the latter, so that according to Dalton's law the steam need only be present in the mixture with a partial pressure. According to the amount of air added, this temperature is more or less below the normal boiling point of water. By adjusting the conditions so that the condensing temperature is equal to or below the temperature of the liquid to be raised, condensation of the steam is prevented. The steam is preferably also utilized for the suction of the required amount of air and for producing the required over pressure. The steam is conducted from the steam generator into a mixing nozzle where it sucks in the air, the mixture still having sufficient pressure to lift the liquid.

The accompanying drawing is a section of apparatus suitable for carrying the invention into effect.

In the drawing $a$ represents a closed saturation vessel as used for the production of sulfate of ammonia; the base of this vessel is provided with a pit $b$ for the salt lye, into which the pipe $c$ dips, said pipe having a bell shaped enlargement $d$ at its lower end. Projecting axially into the enlargement $d$ is the nozzle $e$ of the conduit $f$. Between the conduit $f$ and the steam supply conduit $g$ there is a steam nozzle $k$ regulatable by a spindle $i$, and projecting into a mixing chamber $l$, the latter being connected by an expansion nozzle $m$ to the conduit $f$.

When the apparatus is in operation the steam issuing from the nozzle $k$ sucks a certain amount of air through the orifice $n$ and the steam and air are intimately mixed, whereby the temperature and pressure of the steam are lowered, but the air is heated and its pressure raised.

The mixing is an "adiabatic" process, and the mixture produced is consequently also in a saturated or superheated condition, according to whether saturated or superheated steam is used, although the temperature is lower than the normal boiling temperature. The amount of air added is regulated according to Dalton's law, so that the temperature of the mixture, or the condensation point of the latter, is at or below the temperature of the liquid to be raised. When the mixture of steam and air is introduced by the nozzle $e$ into the bell $d$, it carries with it liquid from the pit $b$, without however diluting this liquid. The raised liquid and the mixture of compressed air and steam then pass out through the tube $c$.

I claim—

1. The method of conveying warm liquids, especially for lifting saline lye from saturation vessels for sulfate of ammonia, by means of a suction jet consisting of a mixture of steam and air, the point of condensation of which mixture is below or at the temperature of the liquid to be raised.

2. The method of conveying warm liquids, especially for lifting saline lye out of saturation vessels for sulfate of ammonia, by means of a suction jet consisting of a mixture of steam and air, the point of condensation of which mixture is below or at the temperature of the liquid to be raised, the said mixture of steam and air being produced by the action of a steam jet sucking air into a mixing chamber and imparting pressure to the air.

3. The method of conveying warm liquids, especially for lifting saline lye out of saturation vessels for sulfate of ammonia, by means of a suction jet consisting of a mixture of steam and air, live steam being introduced by a tube into a mixing chamber having an air inlet, whereby air is sucked in said chamber and compressed, the mixture of steam and air being introduced by a tube into the liquid to be raised, and conveying the liquid to be raised through a conduit.

HEINRICH KOPPERS. [L. S.]

Witnesses:
ALBERT NUFER,
HELEN NUFER.